US007941248B1

(12) United States Patent
Tsamis et al.

(10) Patent No.: US 7,941,248 B1
(45) Date of Patent: May 10, 2011

(54) METHOD AND APPARATUS FOR IMPLEMENTING AND MANAGING AVIONICS FUNCTIONS

(75) Inventors: Demetri Tsamis, Cedar Rapids, IA (US); Joel M. Wichgers, Urbana, IA (US); Steven E. Koenck, Cedar Rapids, IA (US); Andrew M. Vesel, Indialantic, FL (US); Frank Pourahmadi, Hiawatha, IA (US); Steve J. Nieuwsma, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1011 days.

(21) Appl. No.: 11/196,551

(22) Filed: Aug. 3, 2005

(51) Int. Cl.
*G01C 23/00* (2006.01)
(52) U.S. Cl. .......................................... 701/3; 718/104
(58) Field of Classification Search ........ 701/3; 244/189, 244/3.14; 455/1, 424, 425, 426.1; 718/104
See application file for complete search history.

(56) References Cited

U.S. PATENT DOCUMENTS

| | | | | |
|---|---|---|---|---|
| 6,353,846 | B1* | 3/2002 | Fleeson | 718/104 |
| 7,187,927 | B1* | 3/2007 | Mitchell | 455/431 |
| 2003/0199266 | A1* | 10/2003 | Zavidniak | 455/410 |
| 2004/0063425 | A1* | 4/2004 | Wakutsu et al. | 455/418 |
| 2004/0116140 | A1* | 6/2004 | Babbar et al. | 455/517 |
| 2005/0058153 | A1* | 3/2005 | Santhoff et al. | 370/466 |
| 2006/0046716 | A1* | 3/2006 | Hofstaedter et al. | 455/432.2 |

* cited by examiner

*Primary Examiner* — Tuan C To
*Assistant Examiner* — Imran Mustafa
(74) *Attorney, Agent, or Firm* — Matthew J. Evans; Daniel M. Barbieri

(57) ABSTRACT

An avionics system including a software defined radio (SDR) is provided. The SDR includes configurable avionics function implementation circuitry configured to implement each of multiple avionics functions. Also included in the SDR is a priority arbitrator. The priority arbitrator is configured to receive priority control parameters and, based on a make-up of the received priority control parameters, responsively direct the configurable avionics function implementation circuitry to implement a particular priority-based subset (less than all) of the multiple avionics functions.

19 Claims, 12 Drawing Sheets

| Function | Dispatch | Enroute | Transition | Approach | Transition | Cat I | Transition | Cat II | Transition | Cat III |
|---|---|---|---|---|---|---|---|---|---|---|
| HF | P1 x 1 | P1 x 1 | Transition | P2 | Transition | P2 | Transition | P2 | Transition | P2 |
| VHF | P1 x 1 | P1 x 1 | Transition | P1 x 1 | Transition | P1 x 1 | Transition | P1 x 1 | Transition | P1 x 2 |
| GS | P1 x 2 | P2 | Transition | P1 x 3 | Transition | P1 x 1 | Transition | P1 x 2 | Transition | P1 x 3 |
| LOC | P1 x 2 | P2 | Transition | P1 x 3 | Transition | P1 x 1 | Transition | P1 x 2 | Transition | P1 x 3 |
| VOR | P2 | P1 x 1 | Transition | P2 | Transition | P2 | Transition | P2 | Transition | P2 |
| ADF | P2 | P1 x 1 | Transition | P2 | Transition | P2 | Transition | P2 | Transition | P2 |
| MB | P1 x 1 | P2 | Transition | P1 x 1 | Transition | P1 x 1 | Transition | P1 x 1 | Transition | P1 x 1 |
| GNSS | P2 | P1 x 1 | Transition | P2 | Transition | P2 | Transition | P2 | Transition | P2 |
| DME | P2 | P1 x 1 | Transition | P2 | Transition | P2 | Transition | P2 | Transition | P2 |
| Mode-S | P1 x 1 | P1 x 1 | Transition | P1 x 1 | Transition | P1 x 1 | Transition | P1 x 1 | Transition | P1 x 1 |
| TCAS | P2 | P1 x 1 | Transition | P1 x 1 | Transition | P1 x 1 | Transition | P1 x 1 | Transition | P1 x 1 |
| SATCOM | P1 x 1 | P1 x 1 | Transition | P2 | Transition | P2 | Transition | P2 | Transition | P2 |
| LRRA | P1 x 1 | P1 x 1 | Transition | P1 x 3 | Transition | P1 x 1 | Transition | P1 x 2 | Transition | P1 x 3 |
| WAAS | P2 | P1 x 1 | Transition | P2 | Transition | P2 | Transition | P2 | Transition | P2 |
| LAAS | P2 | P1 x 1 | Transition | P2 | Transition | P2 | Transition | P2 | Transition | P2 |

FIG. 3

METHOD AND APPARATUS FOR IMPLEMENTING AND MANAGING AVIONICS FUNCTIONS

BACKGROUND OF THE INVENTION

The present invention relates generally to aviation electronics (avionics) systems. More particularly, the present invention relates to implementing and managing avionics functions in avionics systems that include software defined radios.

Avionics onboard an aircraft include communication, navigation and surveillance functions. These functions provide flight crew members with the capability to communicate with ground-based facilities and control the flight of the aircraft in response to flight conditions according to flight plans. Avionics also provide passenger entertainment in airline operations.

In general, prior art avionics systems have included many dedicated pieces of equipment that each provide a function (also referred to as waveform) to give flight crew members the ability to manually or automatically control the flight of an aircraft. Each piece of equipment (or radio) usually operates to some extent independently of the other pieces of equipment in the avionics system and performs a dedicated function throughout the entire flight. Examples of such separate pieces of equipment include a global positioning system (GPS) navigation device, a radio altimeter, a traffic alert collision avoidance system (TCAS) or a voice communication radio. Having separate dedicated pieces of equipment to perform these functions typically adds to the total equipment costs as well as the weight of the aircraft. Furthermore, having numerous separate dedicated pieces of equipment typically takes up much more volume or space, uses more power, requires more total cooling air, etc., than is used having an integrated set of avionics equipment.

Some more recent avionics systems include one or more software defined radios (SDRs) instead of dedicated pieces of equipment. A SDR essentially includes interconnected hardware and software components that are collectively capable of performing one or more avionics communication, navigation or surveillance function. As compared to the combination of multiple dedicated pieces of equipment, such SDRs are potentially less expensive to manufacture, are lighter, require less space, less power to operate, and potentially require less total cooling air.

Some details and advantages of prior art SDRs are set forth in U.S. Pat. No. 4,658,359, entitled "METHOD FOR MANAGING REDUNDANT RESOURCES IN A COMPLEX AVIONICS COMMUNICATION SYSTEM," U.S. Pat. No. 5,859,878, entitled "COMMON RECEIVE MODULE FOR A PROGRAMMABLE DIGITAL RADIO," U.S. Pat. No. 5,867,535, entitled "COMMON TRANSMIT MODULE FOR A PROGRAMMABLE DIGITAL RADIO," U.S. Pat. No. 5,909,193, entitled "DIGITALLY PROGRAMMABLE RADIO MODULES FOR NAVIGATION SYSTEMS," and U.S. Pat. No. 6,072,994, entitled "DIGITALLY PROGRAMMABLE MULTIFUNCTION RADIO SYSTEM ARCHITECTURE."

Although avionics systems that include SDRs have the earlier-mentioned advantages over systems with dedicated pieces of equipment, in general, current avionics systems carry unutilized or under-utilized redundant equipment to meet function availability and continuity requirements during the phase of flight (dispatch, en-route, approach, etc.) where the function is used. Having substantial redundancy of limited-purpose equipment can burden the airplane infrastructure resources.

SUMMARY OF THE INVENTION

The present invention relates to avionics systems that utilize software defined radios (SDRs) that are re-configurable to meet the mission requirements for all phases of flight while minimizing the number of avionics components.

An avionics system including SDRs is provided. The SDRs include configurable avionics function implementation circuitry that supports reconfiguring the SDRs to meet the mission requirements for each phase of flight. The priority arbitrator is the function that controls each of the SDR's configuration and reconfiguration. The priority arbitrator is configured to receive priority control parameters and, based on a make-up of the received priority control parameters, responsively direct the configurable avionics function implementation circuitry to implement a particular priority-based subset (less than all) of the multiple avionics functions. The priority arbitrator can be implemented in a robust deterministic manner to satisfy the needs for high assurance including, for example, satisfying the Federal Aviation Administration (FAA) certification requirements.

BRIEF DESCRIPTION OF THE DRAWINGS

FIGS. 2D-1, 2D-2, 2D-3 and 2D-4 are diagrams illustrating various sequences for adding and removing waveforms from an avionics SDR.

FIG. 3 is a diagrammatic illustration showing required avionics functions for different phases of flight of an example flight mission.

FIG. 4 is a diagrammatic illustration of a SDR avionics system that is configured to implement the mission-required functions included in FIG. 3.

DETAILED DESCRIPTION OF THE PREFERRED EMBODIMENTS

The present invention relates, in general, to avionics communication, navigation and surveillance systems that utilize software defined radios (SDRs). More specifically, the present invention relates to SDRs that are configured to minimize the number of avionics components and functions. However, before describing components of the SDR of the present invention, one general embodiment that illustrates a SDR avionics system connected to other example systems onboard an aircraft will be discussed.

Figure 1:
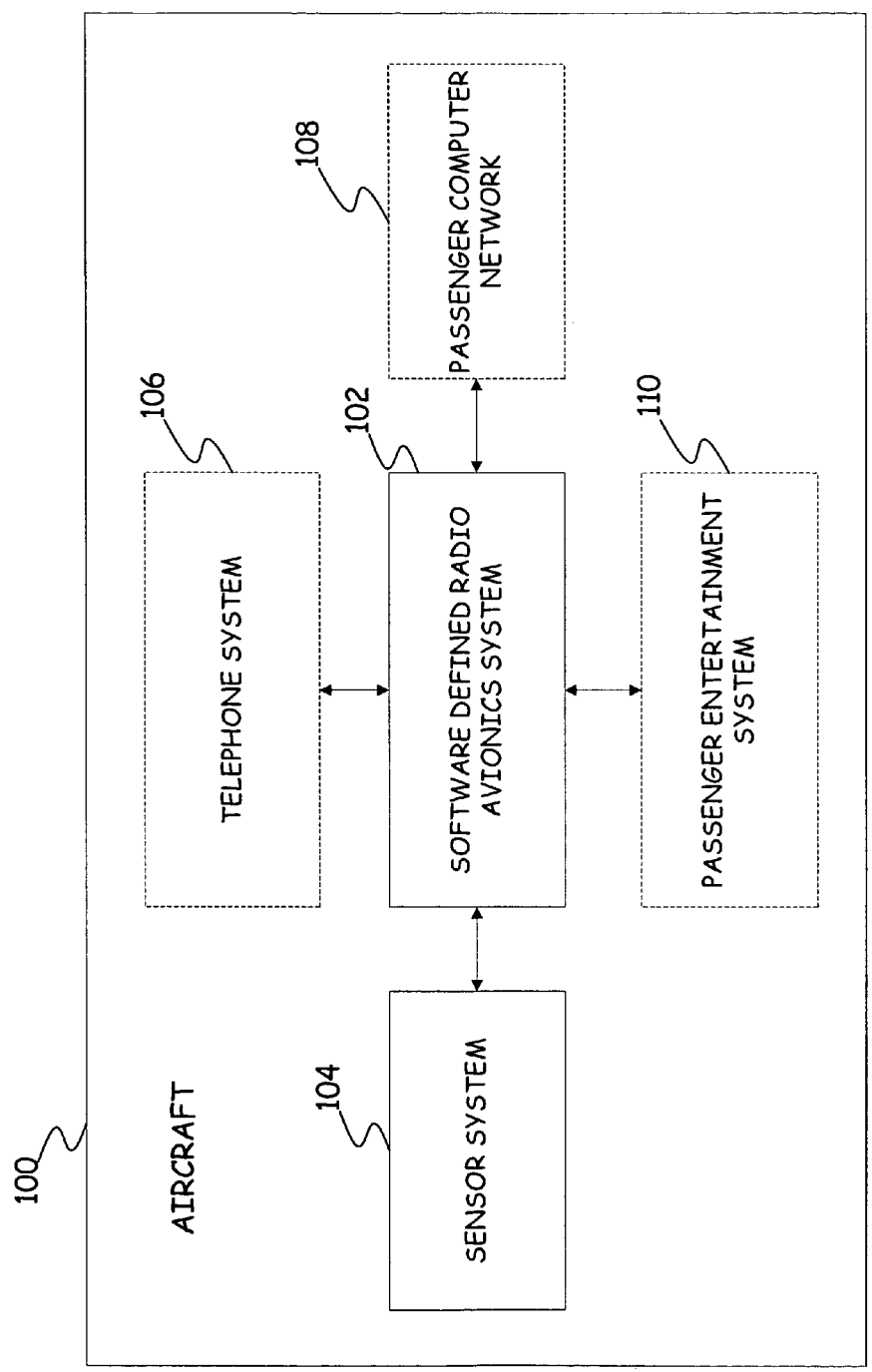
FIG. 1 is a diagrammatic illustration of an aircraft that employs a software defined radio (SDR) avionics system of the present invention.

FIG. 1 is a diagrammatic illustration of an aircraft 100 that employs a SDR avionics system of the present invention. In the example embodiment shown in FIG. 1, hardware, software and firmware systems onboard aircraft 100 include SDR avionics system 102, a sensor system 104, a telephone system 106, a passenger computer network 108 and a passenger entertainment system 110. Systems 106, 108 and 110 are optional and are therefore represented by dashed lines in FIG. 1. SDR avionics system 102, which is connected to the other example aircraft systems shown in FIG. 1, implements functions that provide flight crew members the capability to communicate with ground-based facilities and control the flight of the aircraft in response to flight conditions according to flight plans. SDR avionics system 102 can also provide communications, processing, monitoring, etc. for the sensor system 104, telephone system 106, passenger computer network 106, and passenger entertainment system 110. Details regarding components of, and avionics functions carried out by, SDR avionics system 102 are described further below in connection with FIGS. 2-7.

Sensor system 104, which may include air temperature and pressure sensors, wind condition sensors, one or more antenna groups, etc., provides SDR avionics system 102 with inputs related to flight conditions, for example. Telephone system 106, which includes telephones and/or telephone system infrastructure for passenger use, can be connected to SDR avionics system 102, which, in addition to being able to carry out the above-mentioned functions, can also monitor telephone system 106 and detect and/or report any malfunctions in system 106 to flight crew members, for example. Telephone system 106 may include wireless telephone infrastructure such as a cellular telephone network, whereby the SDR avionics system 102 serves as a cellular base station so that passengers may use their personal cellular telephones in the aircraft cabin. Passenger computer network 108 can include a system that provides passengers with the capability to connect to the Internet. Network 108 can also be an intranet system or subsystem including an aircraft specific intranet, a part of an airline intranet, part of an intranet for a group of airlines or the like. SDR avionics system 102 can monitor network 108 and report any network malfunctions, for example. Passenger entertainment system 110, which can include, for example, any suitable audio and/or video entertainment system, can also be monitored by SDR avionics system 102. In some embodiments, rather than simply monitoring operations of optional systems 106, 108 or 110, SDR avionics system 102 can perform some of the functions of these systems, during particular phases of flight, including for example, communications with off-aircraft ground or satellite equipment.

An example embodiment of a SDR avionics system showing components of a SDR included in the avionics system is described below in connection with FIG. 2A. Descriptions of the processes associated with the operation of the SDR avionics system are shown in FIGS. 2B-2D. More specific embodiments of SDRs that are configured to comply with example regulatory and certification operational requirements for communication, navigation and surveillance (CNS) airborne systems while minimizing redundancy of avionics components and functions, are described further below in connection with FIGS. 3-7.

Figure 2A:
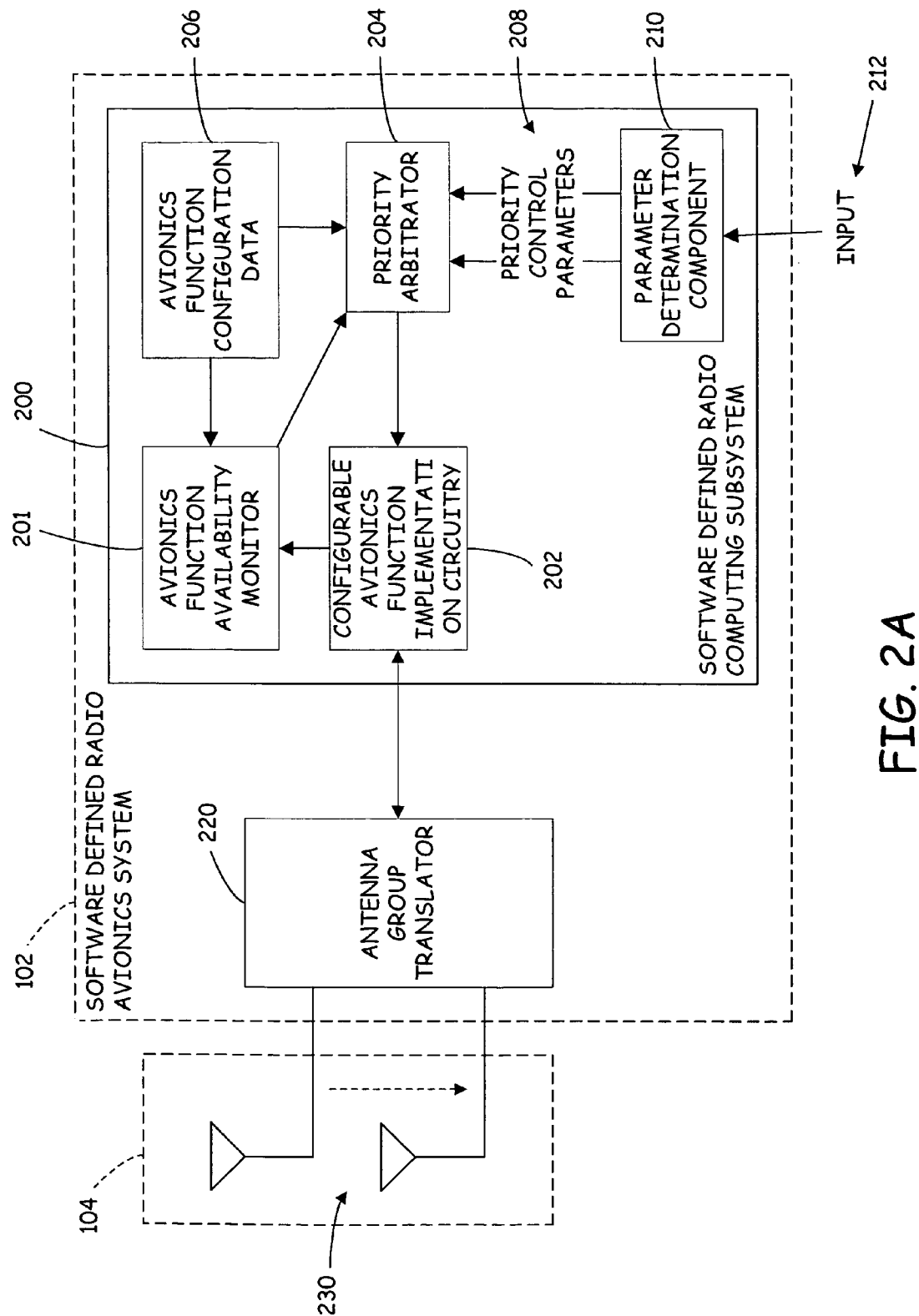
FIG. 2A is diagrammatic illustration of one of one or multiple SDRs included in a SDR avionics system of the present invention.
Figure 2B:
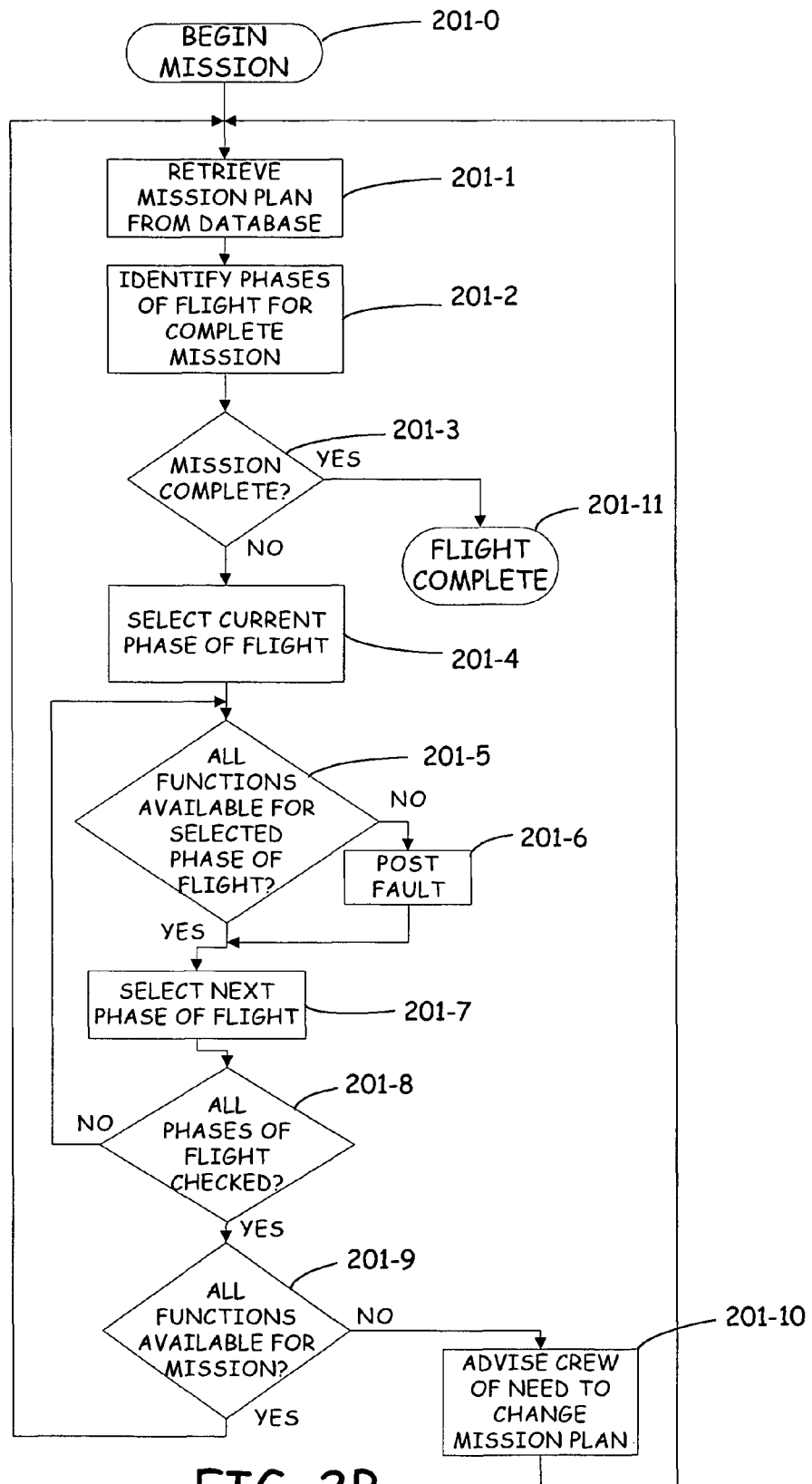
FIG. 2B is a flowchart showing steps of the method for monitoring the availability of the avionics functions that will be needed over the duration of a particular flight mission.
Figure 2C:
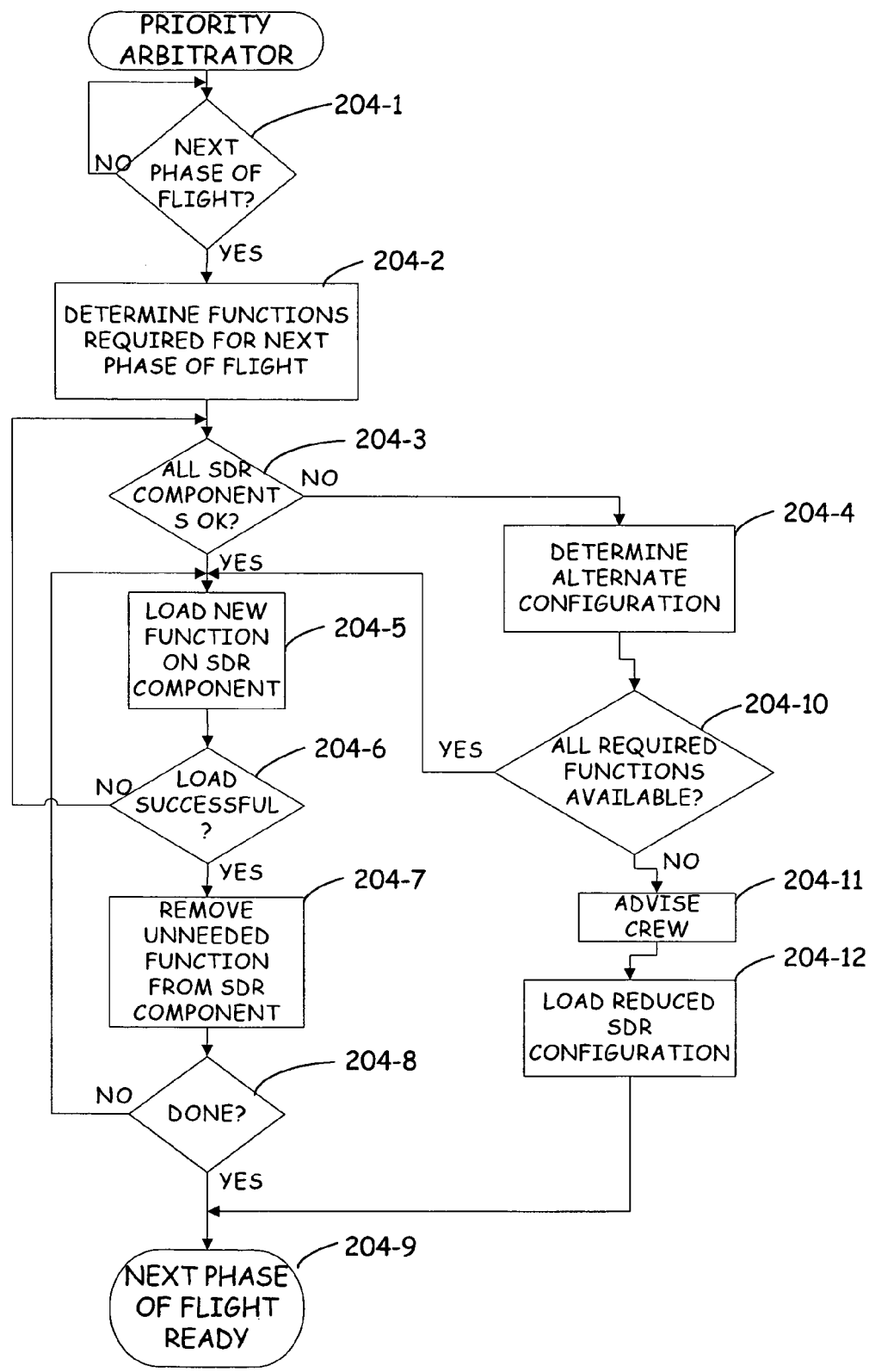
FIG. 2C is a flowchart showing steps of the method for the priority arbitrator to determine the configurations of functions to be loaded into the SDR avionics system.
Figures 1, 2D:
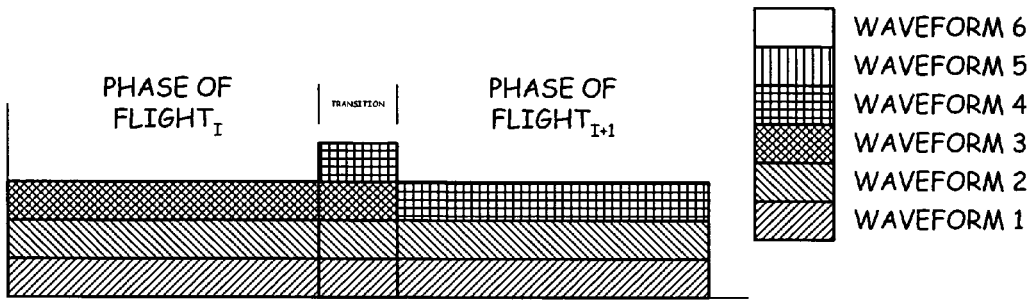

FIG. 2A is a diagrammatic illustration of one of one or multiple SDRs included in SDR avionics system 102. In FIG. 2A, SDR 200 is connected to an antenna group translator 220 that serves as an interface between antenna group 230 (which may be a part of sensor system 104) and SDR 200.

In general, SDR 200 includes interconnected hardware and software components that are collectively capable of performing a number of avionics functions. In accordance with the present invention, SDR 200 is configured to minimize the number of avionics components while being able to meet all the functional, operational and regulatory requirements throughout all phases of the flight or mission. The primary components of SDR 200 that help minimize the number of avionics functions are configurable avionics function implementation circuitry 202 and priority arbitrator 204.

Configurable avionics function implementation circuitry 202 includes any suitable combination of hardware and software components that are collectively capable of implementing one or more of a set of avionics functions. Examples of avionics functions are an instrument landing system (ILS), a traffic alert collision avoidance system (TCAS), a high frequency (HF) communication function, a very high frequency (VHF) communication function, a glide slope (GS) function, a localizer (Loc) function, a VHF omnidirectional range (VOR) function, an automatic direction finder (ADF), a marker beacon (MB) function, a global navigation satellite system (GNSS) function, distance measuring equipment (DME) function, Mode-S message communication function (message formats that include TCAS coordination), an aviation satellite communication system (SATCOM) function, a low range radio altimeter (LRRA) function, a microwave landing system (MLS) receiver function, a GPS wide area augmentation system (WAAS) receiver function and a GPS local area augmentation system (LAAS) receiver function. The SDR 200 typically includes a receiver and may also include a transmitter.

In general, circuitry 202 is configured to implement each of the set of avionics functions (such as the functions listed above) in multiple pre-analyzed (e.g., deterministic) configurations. The avionics function configurations may be identified in advance and analyzed to determine that the behavior of the configurations is satisfactory for safety critical system operation. The results of this process can be used to populate an avionics function configuration data block 206 that stores the SDR configurations that will be loaded into the configurable avionics function implementation circuitry 202 by the priority arbitrator 204 at the appropriate time. Each of the multiple pre-analyzed configurations includes a particular predetermined priority-based subset of the set of avionics functions. Each pre-analyzed configuration (or priority-based subset) of avionics functions is typically a set of avionics functions that are analyzed, prioritized and certified by regulatory authorities such as the Federal Aviation Administration (FAA). Bases for forming different priority-based subgroups or subsets of avionics functions are discussed below.

In an alternate implementation, avionics function configuration data 206 could be generated by a process in a computer in the software defined radio avionics system 102 that includes methods for determination of avionics function configurations that meet certification criteria.

The necessary configurations of different subsets of the set of avionics functions vary according to a phase of flight (dispatch, en-route, approach, etc.), mission, etc., of an aircraft. For example, the ILS is unnecessary during the en-route phase but may be necessary during the approach phase of flight of the aircraft. Circuitry 202 is configured such that its resources can be re-allocated depending upon the operational needs of the aircraft's phase of flight stage, for example. Priority arbitrator 204 helps in directing circuitry 202 to re-allocate its resources. Specifically, priority arbitrator 204, which can include hardware, software and firmware, is configured to receive priority control parameters 208 and, based on a make-up of received priority control parameters 208, responsively direct configurable avionics function implementation circuitry 202 to implement a particular configuration of the avionics functions. The combination of priority arbitrator 204 and configurable avionics function implementation circuitry 202 operates in a deterministic manner (i.e., they form a system whose output is uniquely determined by a make-up of the inputs to and operational status of the system).

Any data needed for configuring or re-configuring circuitry 202 is obtained from component 206, which can comprise any suitable memory (preferably a non-volatile memory) with stored avionics function configuration data, or it can comprise a programmed processor with processes for generation of avionics function configuration data. Also included in SDR 200 is parameter determining component 210, which comprises hardware and software elements, that are configured to receive at least one input 212 and, based on the at least one input 212, determine, and provide, priority control parameters 208 to priority arbitrator 204. Input 212 can be an output from a sensor (such as 104), an input from a passenger entertainment system (such as 110 shown in FIG. 1), an input from a telephone system (such as 106 shown in FIG. 1), an input from a passenger computer network (such as 108 shown in FIG. 1), a manual input provided by a flight crew member, etc. As used herein, a manual input can include a signal (electrical signal, for example) produced when a manual switch, push button, or other device is actuated by a crew member.

As noted above, priority arbitrator 204 directs configurable avionics function implementation circuitry 202 to implement a particular configuration of the avionics functions based on a make-up of priority control parameters 208 that are input to priority arbitrator 204. As mentioned earlier, different combinations of avionics functions are usually required for different phases of flight of an aircraft 100 and therefore priority control parameters 208, that contribute to determining which of the avionics functions are implemented, often relate to at least one phase of flight of aircraft 100. Parameters 208 may relate only to a current phase of flight of aircraft 100, or may relate to a current phase of flight and/or one or more previous or next phases of flight of the aircraft 100. Parameters related to the next phase(s) of flight of an aircraft help priority arbitrator 204 and configurable avionics function implementation circuitry 202 "look ahead" and thereby allocate or re-allocate resources in a manner that ensures a proper transition from one phase of flight to another as well as determine if there are sufficient resources to complete the mission. The latter information is useful for determining whether a modification of the mission is warranted. Making a transition from one phase of flight to another can involve priority controlled arbitrator 204 directing configurable avionics function implementation circuitry 202 to reconfigure from a first phase of flight dependent configuration of avionics functions to a second phase of flight dependent configuration of avionics functions by a transition process that will be described in more detail below. The priority-based subset of the set of avionics functions can be predefined avionics functions that comply with regulatory and certification operational requirements for CNS airborne systems, for example, for a particular phase of flight of the aircraft.

FIG. 2B is a flowchart showing steps of a method for determining the availability of functions on a software defined radio avionics system needed by an aircraft over the entire duration of the mission from takeoff to landing. The steps of the flowchart of FIG. 2B, which are described below, are carried out by element 201 of FIG. 2A. The availability analysis process begins at step 201-0. The mission plan for the aircraft flight is retrieved at step 201-1 and is analyzed at step 201-2 to identify the constituent phases of flight that comprise the entire mission. Since the availability analysis process or FIG. 2B operates continuously over the entire duration of the mission, a check at 201-3 is performed to determine whether the mission has been completed. If it has, the process is concluded at 201-11. If not, the current phase of flight within the mission is selected for analysis at step 201-4. A loop consisting of steps 201-5, 201-7 and 201-8 verifies the availability of every function needed for all of the remaining phases of flight for the mission. During this analysis, any function that is determined to not be available is identified and logged at step 201-6. Upon completion of the analysis loop, step 201-9 queries the log information generated by step 201-6 to determine if there are any functions that the mission plan requires that are not available. If all functions are available, the entire analysis process is repeated to implement continuous available monitoring. If one or more functions are not available, a change to the mission plan may be needed, in which case the crew is advised at, step 201-10. The actions from this point may be either manually managed by the crew, or they may be managed by an automated mission replanning process.

FIG. 2C is a flowchart showing steps of the method for the priority arbitrator to determine the configurations of functions to be loaded into the SDR avionics system. At step 204-1, inputs to the priority arbitrator are received to indicate that a next phase of flight is imminent, so reconfiguration of the SDR should be initiated. At step 204-2, the priority arbitrator determines the functions required to safely enter the next phase of flight. This determination may be made by retrieving information from a database indicative of the minimum equipment list (MEL) required by the governing regulatory agency for continued safe flight of the aircraft during the next phase of flight. Alternatively, this determination may be made by retrieving information from a database indicative of the avionics functions required by the governing regulatory agency for continued safe flight of the aircraft during the next phase of flight, and using this list of functions as an input to a process that determines the configuration of functions to be loaded into the SDR avionics system. Using the information generated by step 204-2, the priority arbitrator then performs a diagnostic check at step 204-3 to determine whether all of the required SDR components are available and ready to host the functions required for the next phase of flight. The actual loading of the function into the SDR is performed at step 204-5 and is verified to be successful in step 204-6. Upon completion of a successful load of a new function in steps 204-5 and 204-6, an unneeded function may be removed from an SDR resource in 204-7. Alternate examples of reconfiguration and removal of waveforms are illustrated in further detail below. Step 204-8 performs a check to determine whether the configuration of all functions needed for the next phase of flight is complete. Upon completion of these steps, the aircraft is ready to safely enter the next phase of flight at step 204-9.

If the SDR components indicated to be needed for the next phase of flight are not available due to failure, malfunction or any other cause, an alternate configuration will be determined at step 204-4. The alternate configuration may include a subset less than the full set determined in step 204-2 that is still considered to be safe by the governing regulatory agency.

This condition will be verified in step 204-10. If it is determined in step 204-10 that all required functions are not available, the crew will be advised of the condition at step 204-11 and a reduced SDR configuration will be loaded at step 204-12, either automatically or by manual action initiated by the crew. The reduced SDR configuration is established by the regulatory agency to provide sufficient functional capability to safely complete the flight of the aircraft.

Referring now to FIG. 2D, examples are shown of alternate methods for reconfiguration and removal of waveforms from the SDR avionics system. In FIGS. 2D-1, waveforms 1, 2 and 3 are operating in a first phase of flight. In the following phase of flight, waveform 3 is not needed, but waveform 4 is needed. A "make before break" approach for phase of flight transition would cause waveform 4 to be added to the configuration before waveform 3 is removed.

Figures 2, 2D:
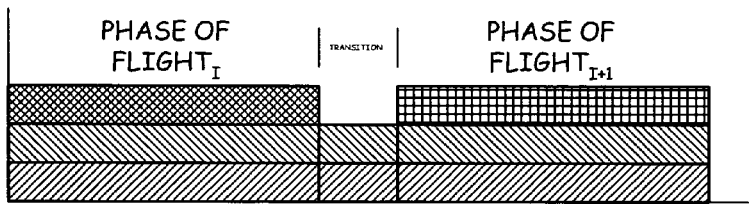

In FIGS. 2D-2, a "break before make" approach is illustrated, where the same waveforms are present during the first phase of flight and the following phase of flight, but waveform 3 is removed before waveform 4 is added. An advantage of the approach in FIGS. 2D-2 over 2D-1 is that only three SDR hosting components are required to make the transition versus four. The potential disadvantage of the approach of FIGS. 2D-2 is that there is a brief period of time when neither waveform 3 nor waveform 4 are available.

Figures 2, 2D, 3:
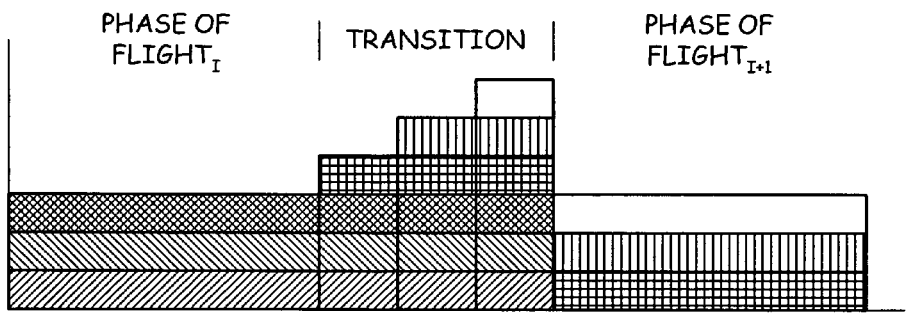

In FIGS. 2C-3 and 2C-4, two separate "make before break" examples are illustrated with waveforms 1, 2 and 3 configured during a first phase of flight, and waveforms 4, 5 and 6 configured during a following phase of flight. FIGS. 2D-3 illustrates an approach where the new waveforms are all added before any waveforms are removed. This approach would require a total of six waveform hosting components. FIGS. 2D-4 illustrates an approach where only one new waveform is added at a time, followed by removal of an unneeded waveform. This approach would require only four waveform hosting components. Alternately, a "break before make" approach similar to the example of FIGS. 2D-2 could be used to reduce the number of required waveform hosting components to three.

FIG. 3 is a diagrammatic illustration showing required avionics functions for different phases of flight of an example flight mission according to a set of criteria such as regulatory requirements. In FIG. 3, all avionics radio functions required for the example mission are listed in the first column (function column). These functions include HF, VHF, GS, Loc, VOR, ADF, MB, GNSS, DME, Mode-S, TCAS, an aviation SATCOM, LRRA, WAAS and LAAS. Conventionally, most or all of these radio functions have been implemented using dedicated radios or circuitry specific to implementing that function or a limited combination of functions. However, under the present invention, non-dedicated SDRs are used to implement the above-noted example of mission-required functions. The non-dedicated SDRs are capable of re-allocating lower-priority resources to accomplish higher priority functions under control of the priority arbitrator 204. The priority-based implementation of the above mission-required functions is described further below in connection with FIGS. 4-8.

In FIG. 3, the remaining columns (columns to the right of the function column described above) contain information related to a redundancy-level (or number of instances), during different phases of flight (dispatch, en-route transition, approach, category (Cat) I, Cat II and Cat III) of the mission. Different phases of flight are understood in the art for having particular flight stages or conditions. For each phase of flight of the example mission, some of the mission-required functions are assigned a priority level 1 (P1) and the remaining mission-required functions are assigned a priority level 2 (P2). P1 functions for a particular phase of flight are those functions that must be available for that phase of flight in order to comply with regulatory and certification operational requirements for CNS airborne systems. The number of instances of each P1 function required for the respective phases of flight is based upon regulatory requirements. The transitions between phases of flight may be implemented according to the examples illustrated in FIG. 2C. P2 functions are those mission-required functions that are not required by regulation for supporting the operations being conducted in the corresponding phases of flight. Additional levels of function priority can be included; although, only two levels have been illustrated in FIG. 3 for simplicity.

Additional function priority levels (more than P1 and P2 as described in the example above) would typically be included in the waveform priority arbitrator. For example, of the priority 2 (P2) functions identified in FIG. 3, a given mission may have additional priority levels for maintaining some of the "P2" functions over the others in order to minimize the impact on the mission. Even with the priority 1 (P1) functions identified in FIG. 3, a given mission will typically have additional priority levels for situations where the SDRs cannot perform all the P1 functions, such as in emergency conditions including minimum power.

Figures 2, 2D, 3, 4:
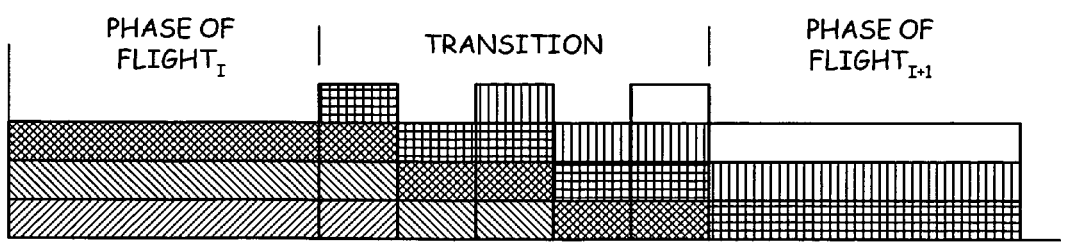
Figure 4:
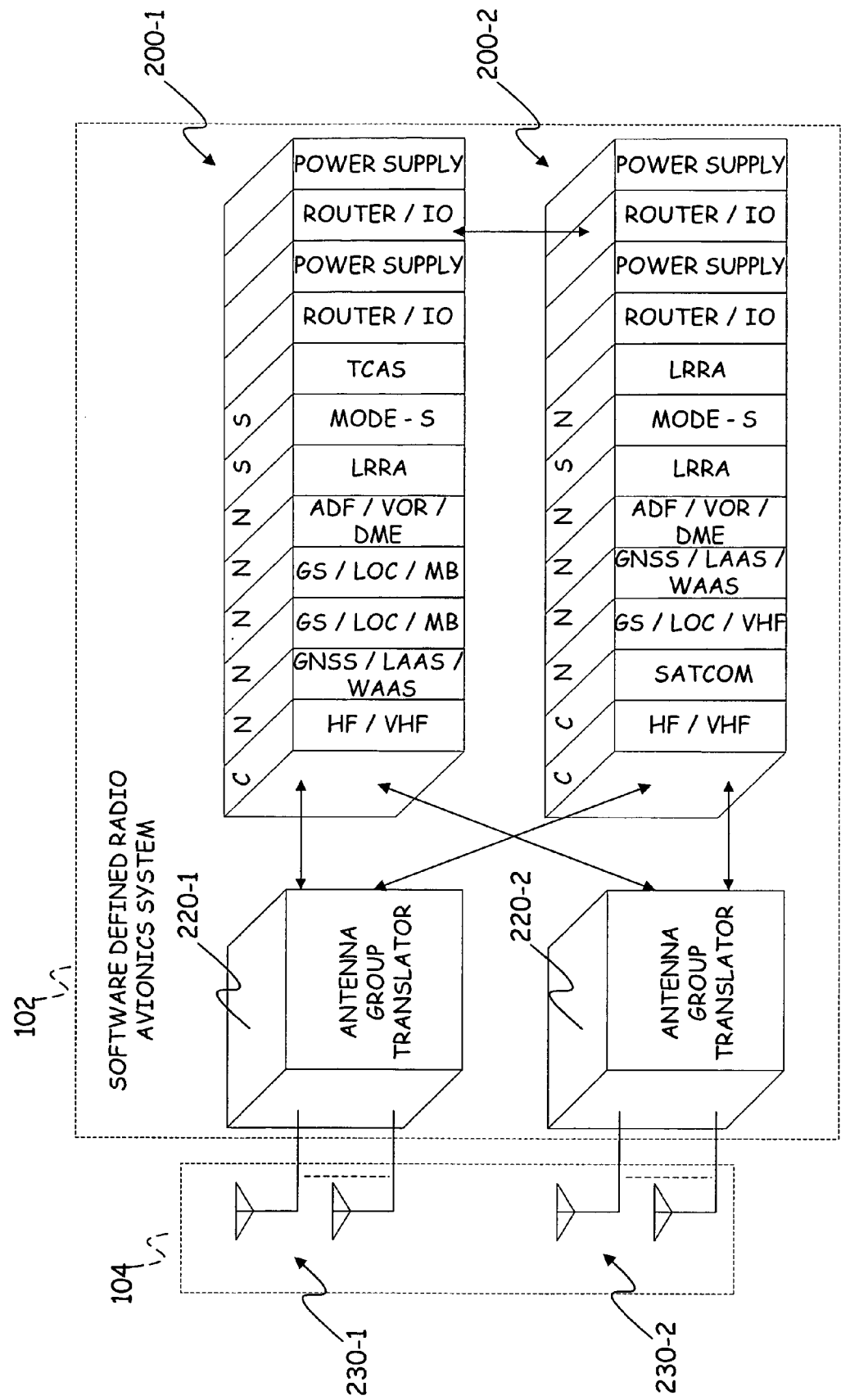

FIG. 4 is a diagrammatic illustration of a SDR avionics system according to the present invention that is configured to implement the mission-required functions listed in FIG. 3. SDR avionics system 102 of FIG. 4 includes a first SDR 200-1, a second SDR 200-2, and antenna group translators 220-1 and 220-2. Antenna group translators 220-1 and 220-2 serve as interfaces between different antenna groups such as 230-1 and 230-2 and SDRs 200-1 and 200-2. SDRs 200-1 and 200-2 are configured to implement different communication, navigation and surveillance functions needed for the example mission.

In SDRs 200-1 and 200-2, boxes (which represent configurable modules) that are designated with a function type C implement communication functions, boxes designated N implement navigation functions and boxes designated S implement surveillance functions. As can be seen in FIG. 3, each of the C, N and S boxes implement at least one of the mission-required functions listed in FIG. 3. Also, certain C, N and S functions are redundant to comply with the regulation requirements as shown in FIG. 3 and discussed earlier. Redundancy requirements can be related to the required performance corresponding to availability, continuity, and integrity of function based upon the particular implementation. In general, any box within SDR 200-1 or 200-2 with a C, N or S designation is a configurable module and any box without a C, N, or S designation can be dedicated circuitry (redundant if necessary) for performing certain required functions. While the SDR avionics system 102 in FIG. 3. illustrates an example configuration of communication (C), navigation (N), and surveillance (S) functions where only one of either a C, N, or S subset of functions is allocated to a box (or module) of the SDRs (201-1 and 201-2), this is only an example configuration and combinations of C, N, and S functions could be allocated to each box (or module) of the SDRs (201-1 and 201-2). In FIG. 4, dedicated power supply circuitry and dedicated router input and output circuitry, both of which are redundant, are included.

Figure 5:
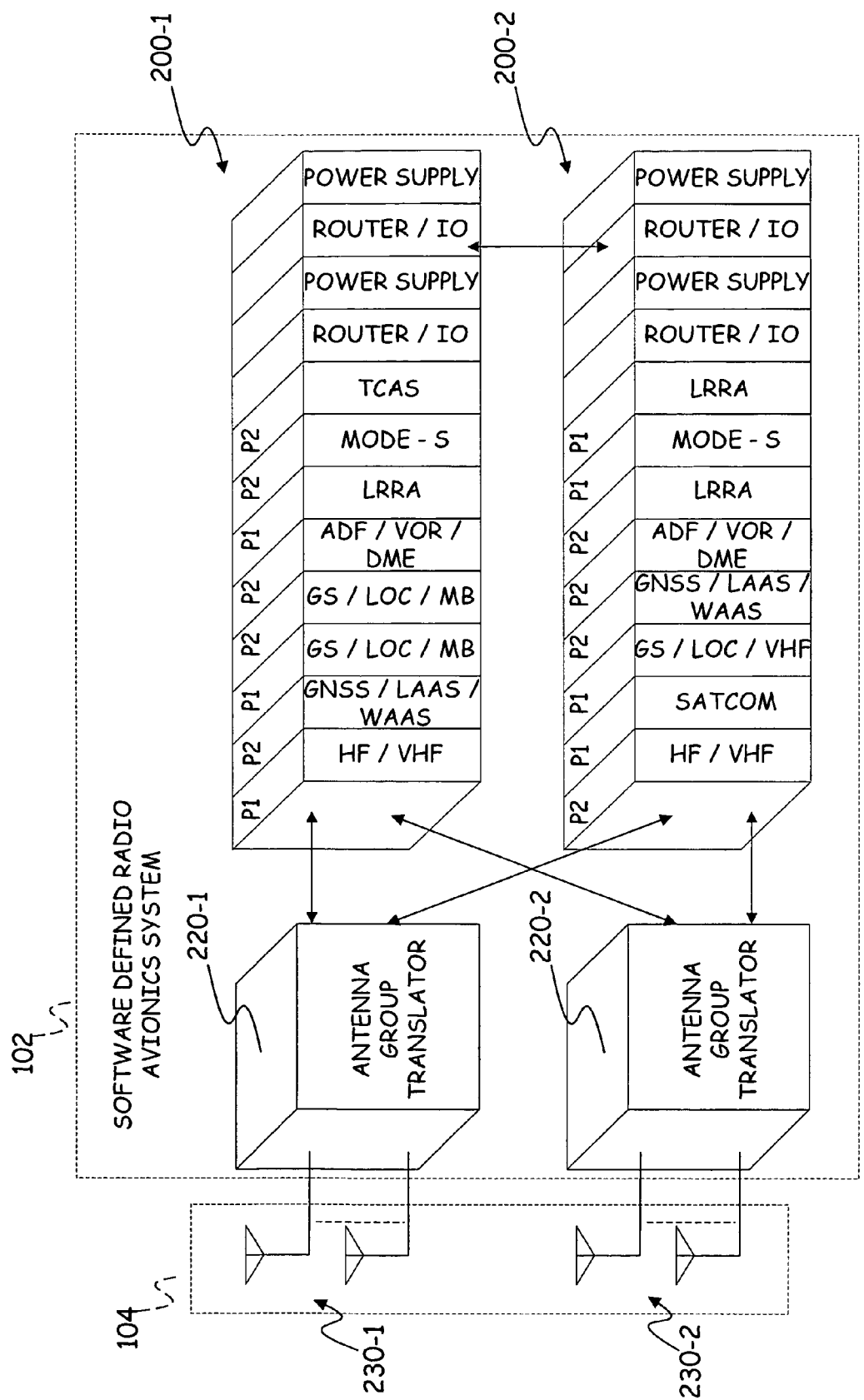
FIG. 5 is a diagrammatic illustration of the SDR avionics system of FIG. 4 with the mission-required functions prioritized for a dispatch phase of flight.
Figure 6:
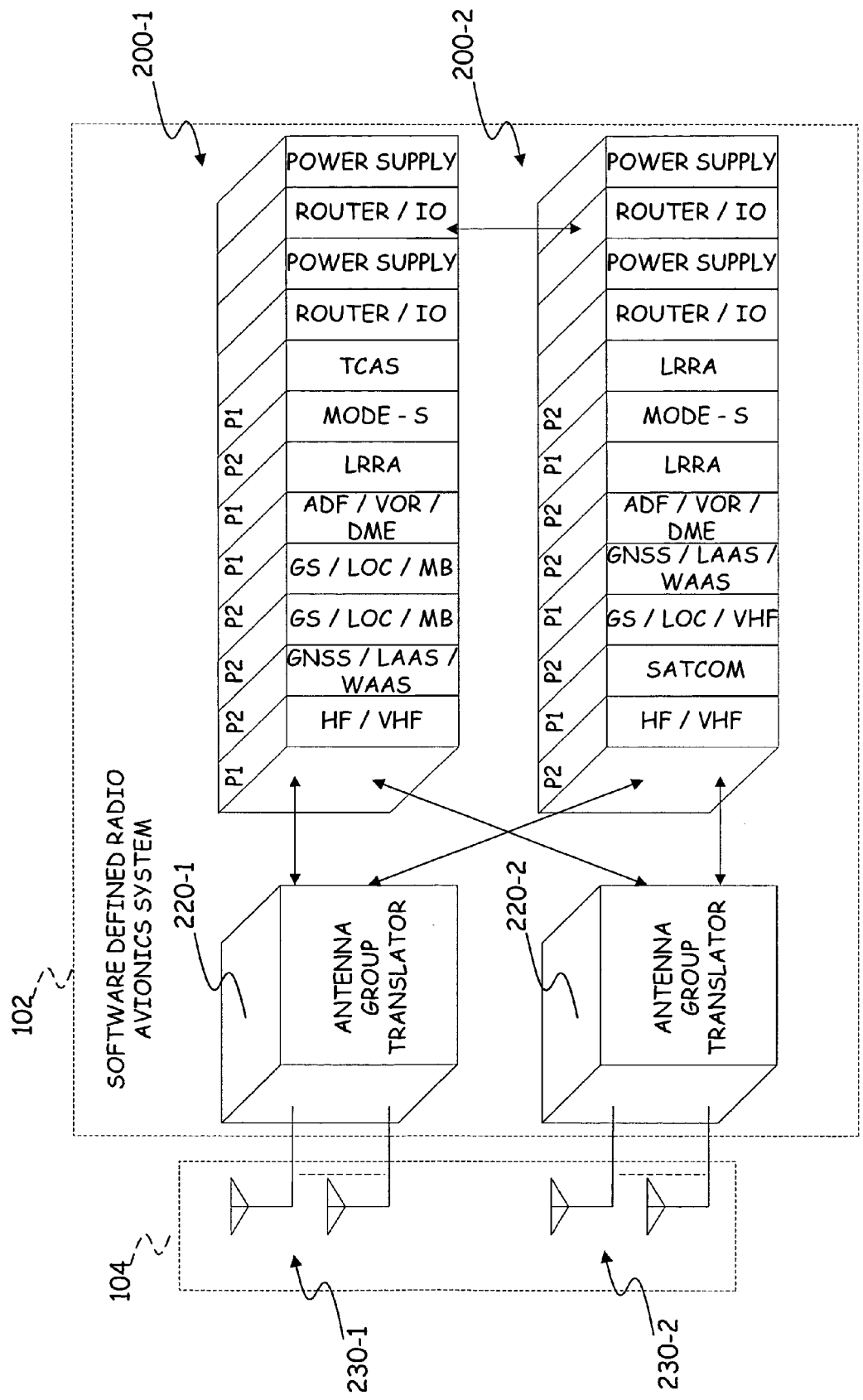
FIG. 6 is a diagrammatic illustration of the SDR avionics system of FIG. 4 with the mission-required functions prioritized for an en-route phase of flight.
Figure 7:
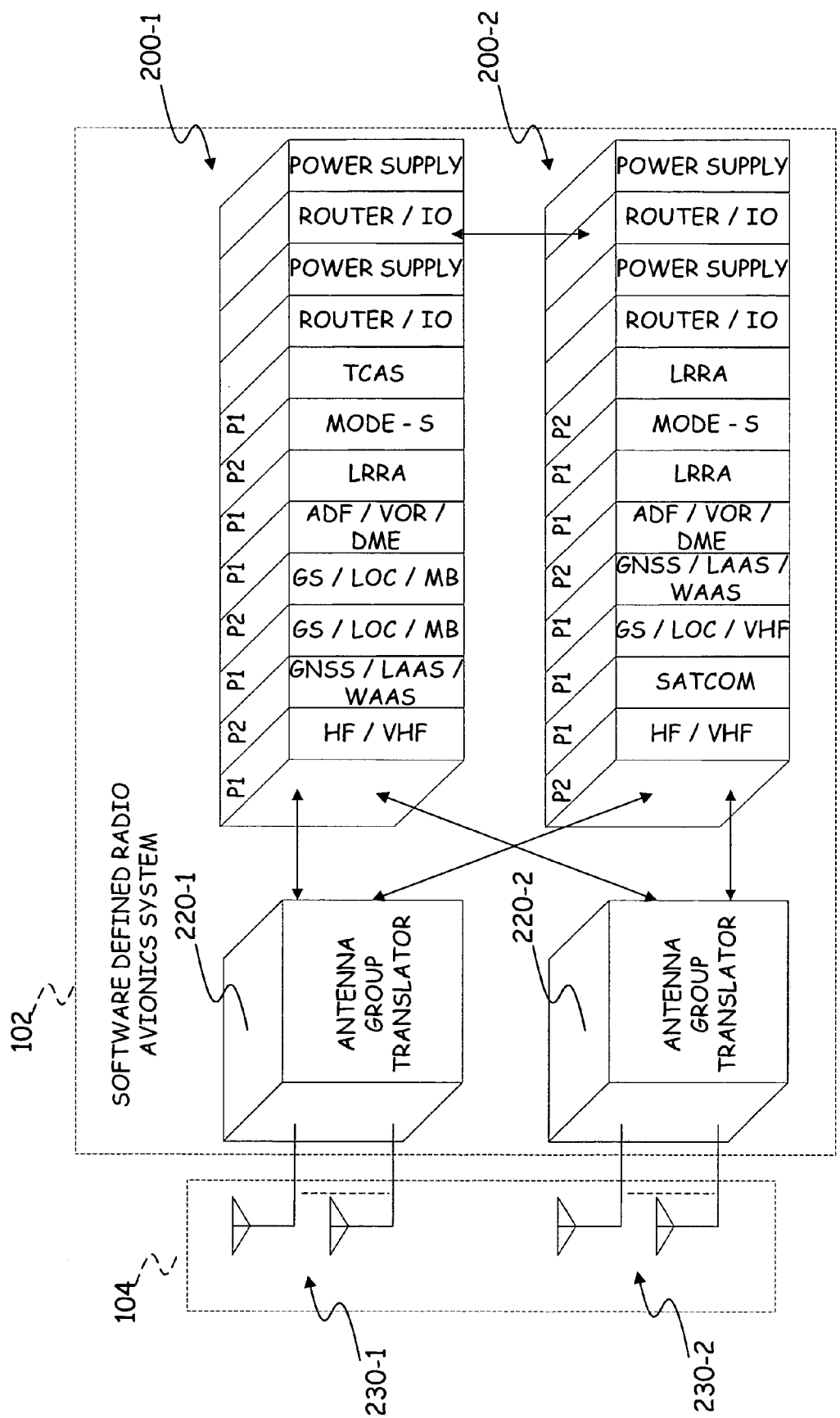
FIG. 7 is a diagrammatic illustration of the SDR avionics system of FIG. 4 with the mission-required functions prioritized for a transition (en-route to approach) phase of flight.

SDRs 200-1 and 200-2 communicate with each other to exchange information related to function implementation status, function redundancy, function priority for different phases of flight, etc. This helps meet function availability for the mission and helps maintain continuity and integrity within SDR avionics system 102 of FIG. 4. FIGS. 5-7, which are described below, illustrate different priority-based configurations of C, N and S functions in SDRs 200-1 and 200-2 for different phases of flight.

Figure 8:
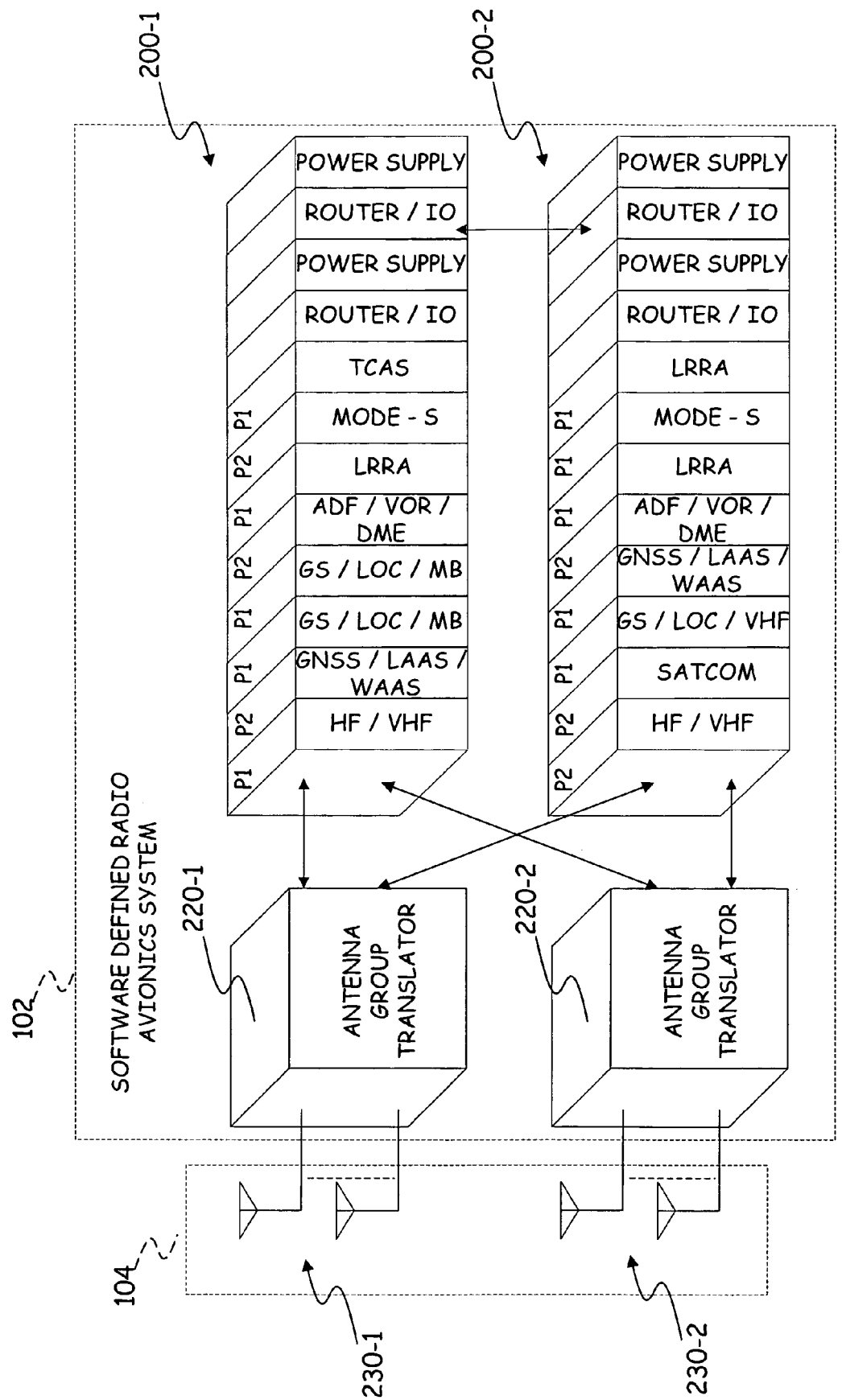
FIG. 8 is a diagrammatic illustration of the SDR avionics system of FIG. 4 with the mission-required functions prioritized for a category III automated landing phase of flight.

FIG. 5 is a diagrammatic illustration of the SDR avionics system of FIG. 4, with the mission-required functions prioritized for a dispatch phase of flight in accordance with the priority requirements listed in the dispatch column of FIG. 3. FIG. 6 is a diagrammatic illustration of the SDR avionics system of FIG. 4, with the mission-required functions prioritized for an en-route phase of flight in accordance with the priority requirements listed in the en-route column of FIG. 3. FIG. 7 is a diagrammatic illustration of the SDR avionics system of FIG. 4, with the mission-required functions prioritized for a transition (en-route to approach) phase of flight in accordance with the priority requirements listed in the transition column of FIG. 3. FIG. 8 is a diagrammatic illustration of the SDR avionics system of FIG. 4, with the mission-required functions prioritized for a Cat III approach and landing phase of flight in accordance with the priority requirements listed in the Cat III column of FIG. 3. For simplification, the C, N and S designations are not included in FIGS. 5-7. P1 and P2 are use to designate priorities of the respective C/N/S functions (or boxes) in FIGS. 5-7. Each of FIGS. 5-7 have different function priority configurations in SDRs 200-1 and 200-2. The re-allocation of function priorities are carried out without changing any hardware components within SDR 200-1 and 200-2. Thus, by allocating functions based upon priority, the mission needs can be accomplished using significantly less equipment.

Under the present invention, all of the following are possible: circumvent failed equipment, re-allocate resources performing lower-priority functions to accomplish higher priority functions, alter function priorities based on the current phase of flight, alter function priorities based on one or more next phases of flight, implement security safeguards, interleave lower priority functions with higher priority functions maintaining both, etc. As noted earlier, the reconfigurable equipment function implementations of the present invention can be verified and certified for compliance and operation under critical regulatory requirements.

Figure 9:
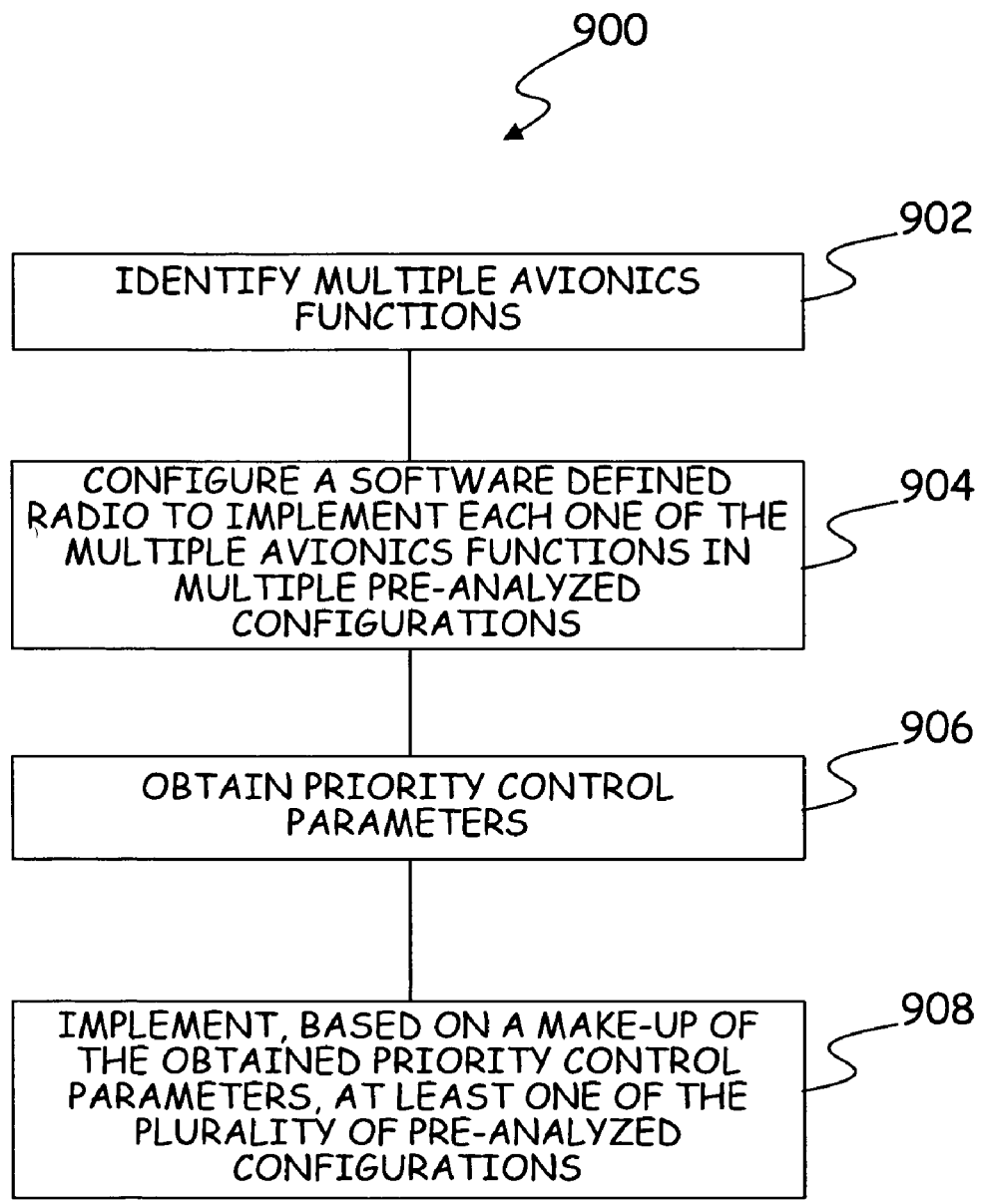
FIG. 9 is a flowchart showing steps of a method of implementing avionics functions in a SDR in accordance with an embodiment of the present invention.

FIG. 9 is a flowchart 900 showing steps of a method of implementing avionics functions in a SDR in accordance with an embodiment of the present invention. At step 902, multiple avionics functions are identified. At step 904, the SDR is configured to implement each one of the multiple avionics functions. At step 906, priority control parameters are obtained. At step 908, based on a make-up of the obtained priority control parameters, a particular priority-based subset of multiple avionics functions is implemented. Different techniques, some of which are set forth above, can be employed to carry out the steps shown in the above flowchart while maintaining substantially the same functionality without departing from the scope and spirit of the present invention. For example, instead of selecting from a set of multiple pre-analyzed configurations, the analysis of the configurations may be accomplished by a process executing on a computer associated with the SDR system.

Although the present invention has been described with reference to preferred embodiments, workers skilled in the art will recognize that changes may be made in form and detail without departing from the spirit and scope of the invention.

What is claimed is:

1. A method of configuring a software defined radio of an aircraft to implement a plurality of avionics functions, the software defined radio comprising configurable avionics function implementation circuitry, the method comprising:

receiving, at a priority arbitrator of the software defined radio, an input indicating that a next phase of flight of the aircraft is imminent and that the software defined radio should be reconfigured;

using the priority arbitrator to determine a full set of avionics functions for the next phase of flight;

using the priority arbitrator to determine the availability of all required components of the configurable avionics function implementation circuitry needed to implement the full set of avionics functions for the next phase of flight and to identify components of the configurable avionics implementation circuitry which are unavailable, due to failure, to implement the full set of avionics functions for the next phase of flight such that the full set of avionics functions for the next phase of flight cannot be implemented by available components of the configurable avionics function implementation circuitry;

upon identification of the components of the configurable avionics implementation circuitry which are unavailable, due to failure, to implement the full set of avionics functions for the next phase of flight, using the priority arbitrator to determine an alternate deterministic configuration which includes a subset of avionics functions which is less than the full set of avionics functions for the next phase of flight; and automatically loading into the configurable avionics function implementation circuitry the alternate deterministic configuration, which includes the subset of avionics functions which is less than the full set of avionics functions for the next phase of flight, to reconfigure the software defined radio.

2. The method of claim 1, further comprising using the priority arbitrator to advise a flight crew member of the aircraft that the full set of avionics functions for the next phase of flight are not available for implementation in the configurable avionics function implementation circuitry.

3. The method of claim 1, wherein the alternate deterministic configuration is pre-analyzed in implementation in configurable avionics function implementation circuitry.

4. The method of claim 1, wherein the input indicating that the next phase of flight is imminent is an output from a sensor.

5. The method of claim 1, wherein the input indicating that the next phase of flight is imminent is a manual input provided by a flight crew member.

6. The method of claim 1, further comprising a parameter determining component configured to receive the input indicating that the next phase of flight is imminent, and, based on the input indicating that the next phase of flight is imminent, determine, and provide priority control parameters to the priority arbitrator.

7. The method of claim 6, wherein the priority control parameters also relate to a current phase of flight of the aircraft that includes the software defined radio.

8. The method of claim 6, wherein the priority control parameters relate to a past phase of flight, a current phase of flight, and the next phase of flight of the aircraft that includes the software defined radio.

9. The method of claim 1, wherein the priority arbitrator is configured to reconfigure the configurable avionics function implementation circuitry to implement the alternate deterministic configuration using a make before break approach.

10. The method of claim 1, wherein the priority arbitrator is configured to reconfigure the configurable avionics function implementation circuitry to implement the alternate deterministic configuration using a break before make approach.

11. The method of claim 1, wherein automatically loading into the configurable avionics function implementation circuitry the alternate deterministic configuration, which includes the subset of avionics functions which is less than the full set of avionics functions for the next phase of flight, to configure the software defined radio, includes:

using the priority arbitrator to implement in the configurable avionics function implementation circuitry a first avionics function, of the subset of avionics functions, in a current phase of flight of the aircraft;

using the priority arbitrator to implement in the configurable avionics function implementation circuitry a second avionics function, of the subset of avionics functions, in the current phase of flight of the aircraft;

using the priority arbitrator to implement in the configurable avionics function implementation circuitry a third avionics function, of the subset of avionics functions, in the current phase of flight of the aircraft;

using the priority arbitrator to implement in the configurable avionics function implementation circuitry a fourth avionics function, of the subset of avionics functions, in the current phase of flight of the aircraft; and using the priority arbitrator to remove, from the configurable avionics function implementation circuitry, the third avionics function of the subset of avionics functions while still in the current phase of flight.

12. A software defined radio comprising:

configurable avionics function implementation circuitry configured to:

implement each of a plurality of avionics functions in a plurality of deterministic configurations; and re-allocate available resources in the configurable avionics function implementation circuitry depending upon operational needs of a phase of flight of an aircraft; and a priority arbitrator configured to:

receive inputs indicating that a next phase of flight is imminent and that the software defined radio should be reconfigured;

determine a full set of avionics functions for the next phase of flight;

determine the availability of all required components of the configurable avionics function implementation circuitry needed to implement the full set of avionics functions for the next phase of flight and identify components of the configurable avionics implementation circuitry which are unavailable, due to failure, to implement the full set of avionics functions for the next phase of flight such that the full set of avionics functions for the next phase of flight cannot be implemented by available components of the configurable avionics function implementation circuitry;

upon identification of the components of the configurable avionics implementation circuitry which are unavailable, due to failure, to implement the full set of avionics functions for the next phase of flight, determine an alternate deterministic configuration which includes a subset of avionics functions which is less than the full set of avionics functions for the next phase of flight; and automatically load into the configurable avionics function implementation circuitry the alternate deterministic configuration, which includes the subset of avionics functions which is less than the full set of avionics functions for the next phase of flight, to reconfigure the software defined radio.

13. The software defined radio of claim 12, further comprising memory with stored avionics function configuration data, wherein the stored avionics function configuration data is used to reconfigure configurable avionics function implementation circuitry.

14. The software defined radio of claim 12, further comprising a programmed processor with processes for generation of avionics function configuration data, wherein the avionics function configuration data is used to reconfigure configurable avionics function implementation circuitry.

15. The software defined radio of claim 12, wherein the priority arbitrator is further configured to receive priority control parameters relating to a current phase of flight of the aircraft.

16. The software defined radio of claim 12, wherein the priority arbitrator is further configured to receive priority control parameters relating to a past phase of flight, a current phase of flight, and the next phase of flight of the aircraft.

17. The software defined radio of claim 12, wherein inputs indicating that the next phase of flight is imminent and that the software defined radio should be reconfigured are outputs from sensors.

18. The software defined radio of claim 12, wherein inputs indicating that the next phase of flight is imminent and that the software defined radio should be reconfigured are inputs provided by a flight crew member of the aircraft.

19. The software defined radio of claim 12, wherein the priority arbitrator is further configured to advise a flight crew member of the aircraft that the full set of avionics functions for the next phase of flight are not available for implementation in the configurable avionics function implementation circuitry.

* * * * *